United States Patent [19]

Cohn

[11] Patent Number: 5,247,497
[45] Date of Patent: Sep. 21, 1993

[54] SECURITY SYSTEMS BASED ON RECORDING UNIQUE IDENTIFIER FOR SUBSEQUENT PLAYBACK

[75] Inventor: Robert Cohn, Saratoga, Calif.

[73] Assignee: Octel Communications Corporation, Milpitas, Calif.

[21] Appl. No.: 793,561

[22] Filed: Nov. 18, 1991

[51] Int. Cl.$^5$ ............................................. G11B 19/00
[52] U.S. Cl. ..................................... 369/26; 369/25; 369/28; 369/29; 379/88; 379/89; 379/95
[58] Field of Search ..................... 369/29, 28, 25, 26; 379/88, 89, 95

[56] References Cited

U.S. PATENT DOCUMENTS

| | | | |
|---|---|---|---|
| 4,697,282 | 9/1987 | Winter et al. | 379/88 |
| 4,761,807 | 8/1988 | Matthews et al. | 379/89 |
| 4,998,272 | 3/1991 | Hawkins, Jr. et al. | 379/88 |
| 5,008,835 | 4/1991 | Jachmann et al. | 369/29 |
| 5,136,648 | 8/1992 | Olson et al. | 379/88 |

Primary Examiner—Robert J. Pascal
Assistant Examiner—R. A. Rayliff
Attorney, Agent, or Firm—Robert R. Jackson

[57] ABSTRACT

In order to enable an authorized user of a secured system to detect unauthorized use of that system, the system records identifying information about the user (e.g., a sample of the user's voice) each time the user uses the system. The system also plays back to the user the information recorded the last time that user used the system. If the user does not recognize the information played back or detects anything else wrong with that information, the user knows that someone else has gained access or at least attempted to gain access to the system by posing as him or her.

16 Claims, 5 Drawing Sheets ns: 5,247,497

SECURITY SYSTEMS BASED ON RECORDING UNIQUE IDENTIFIER FOR SUBSEQUENT PLAYBACK

BACKGROUND OF THE INVENTION

This invention relates to security systems, and more particularly to security systems based on recording and subsequently playing back identifying information which is truly unique to each possible user of the system.

Many voice processing systems (e.g., voice mail or voice messaging systems) include the capability of allowing an authorized user to call in from virtually anywhere (e.g., using the ordinary commercial telephone network) in order to use the system. For example, an authorized user of a voice mail system may call in to that system, enter a password via the keypad of the telephone from which he or she is calling, and then listen to any messages left in his or her "mailbox" in the system and/or otherwise use the system. If anyone else has knowledge of the authorized user's password, that other person can employ that password to listen to the authorized user's messages or otherwise improperly use the system without the authorized user knowing that this has occurred.

Voice mail systems are just one example of systems which may be subject to currently undetectable improper use of the kind described above. Other examples include telephone answering systems, information center or public bulletin board systems, audio-text systems, interactive voice response systems, computer and/or telephone systems generally, forms systems, automated attendant systems, or any other type of system where a user can enter the system by using a password or other secured entry method. The problem with all such systems is that an unauthorized user may learn one or more valid passwords or otherwise deduce how to employ or circumvent the secured entry feature and thereby gain undetected access to information in the system or make undetected improper use of the system.

In view of the foregoing, it is an object of this invention to provide improved security techniques for use in systems of the types described above.

It is another object of this invention to provide security techniques for systems of the type described above which make it possible for an authorized user to detect that an unauthorized individual may have "broken into" the system.

SUMMARY OF THE INVENTION

These and other objects of the invention are accomplished in accordance with the principles of this invention by providing security system methods and apparatus which require each user of the protected system to record some identifying information before being allowed to make any further use of the protected system. The recorded information is preferably truly unique to the individual making the recording. For example, the recorded information may be a brief spoken message such as the person's name and the current time of day. Other examples include a voice print of the person's voice, a video image of the person's face, a fingerprint image, a DNA identifier, etc. In addition to being highly unique to the individual making the recording, the recorded information also preferably includes a component which is variable, and still more preferably random. In the above-mentioned example in which the person making the recording must state his or her name and the current time of day, the time of day component is variable. As an alternative, the person could be required to speak a random number or a random phrase generated by the system in order to provide a recording of information which is at once unique, variable, and random.

The next time the user uses the system, the system plays back the identifying information it recorded the last time that user used the system. In this way the user can tell immediately whether or not someone else has broken into the system. For example, if the identifying information includes voice, the user will know whether or not the voice played back is his or her own voice. The user can then take steps appropriate to possible unauthorized use of the system. As mentioned above, the recorded information preferably includes a variable component (and still more preferably a random component) to make it more difficult or impossible for an unauthorized user to somehow capture (e.g., record in advance) the information the authorized user will be required to record.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
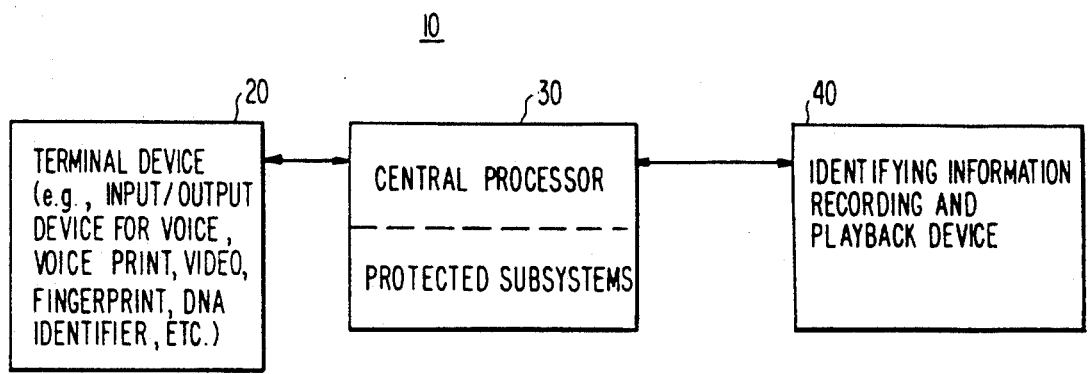
FIG. 1 is a simplified block diagram of an illustrative secured system constructed in accordance with this invention.

As shown in FIG. 1 an illustrative system 10 protected in accordance with this invention includes a conventional terminal device 20, a generally conventional but specially and uniquely programmed central processor 30, and a conventional device 40 for recording and playing back identifying information of whatever kind is used in accordance with this invention to help protect the system from unauthorized use. In the case of a voice mail system, for example, terminal device 20 may be one of many conventional telephone instruments selectively connectable to processor 30 via the conventional commercial telephone network. Continuing with this example, processor 30 may be a conventional voice mail system processor with the addition of the software needed to control device 40 as described in detail below. In general, anyone can gain access to some of the functions performed by central processor 30 by dialing into it from any telephone 20. However, processor 30 will only admit a user to its protected subsystems after the user has satisfied predetermined security requirements. Thus, for example, anyone may be able to leave a message for a system subscriber without encountering the security system. But a purported subscriber can only hear messages left for him or her by first supplying valid security information (e.g., entering a valid password via the keypad on telephone 20). Device 40 may be any device suitable for recording and subsequently playing back whatever kind of identifying information the security system of this invention is set up to require. For example, if the required identifying information is voice information, device 40 may be any suitable analog or digital voice recording and playback apparatus.

Figure 2A:
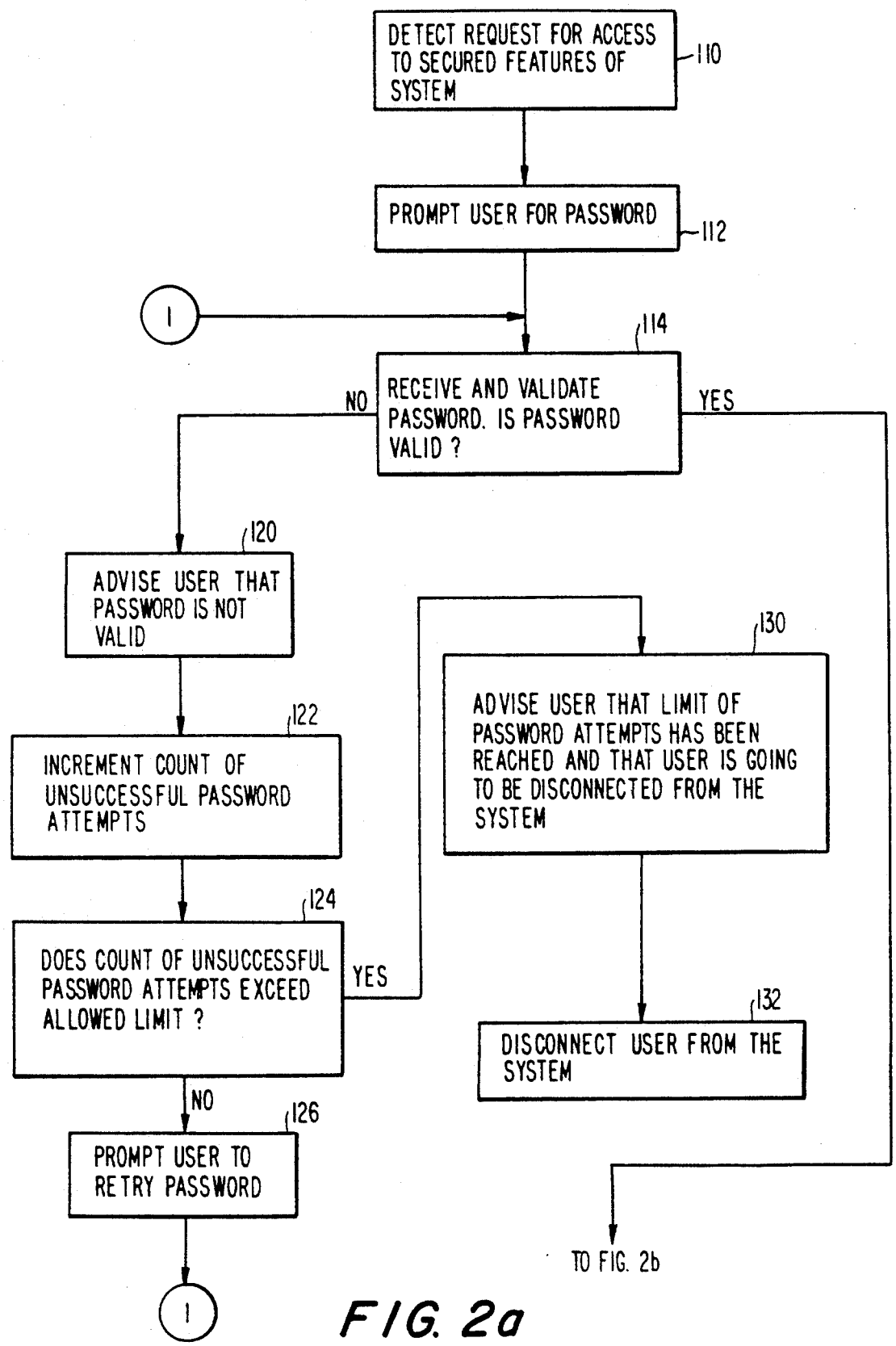
FIGS. 2a-2c (sometimes referred to collectively as FIG. 2) are a flow chart of illustrative security method steps in accordance with this invention.
Figure 2B:
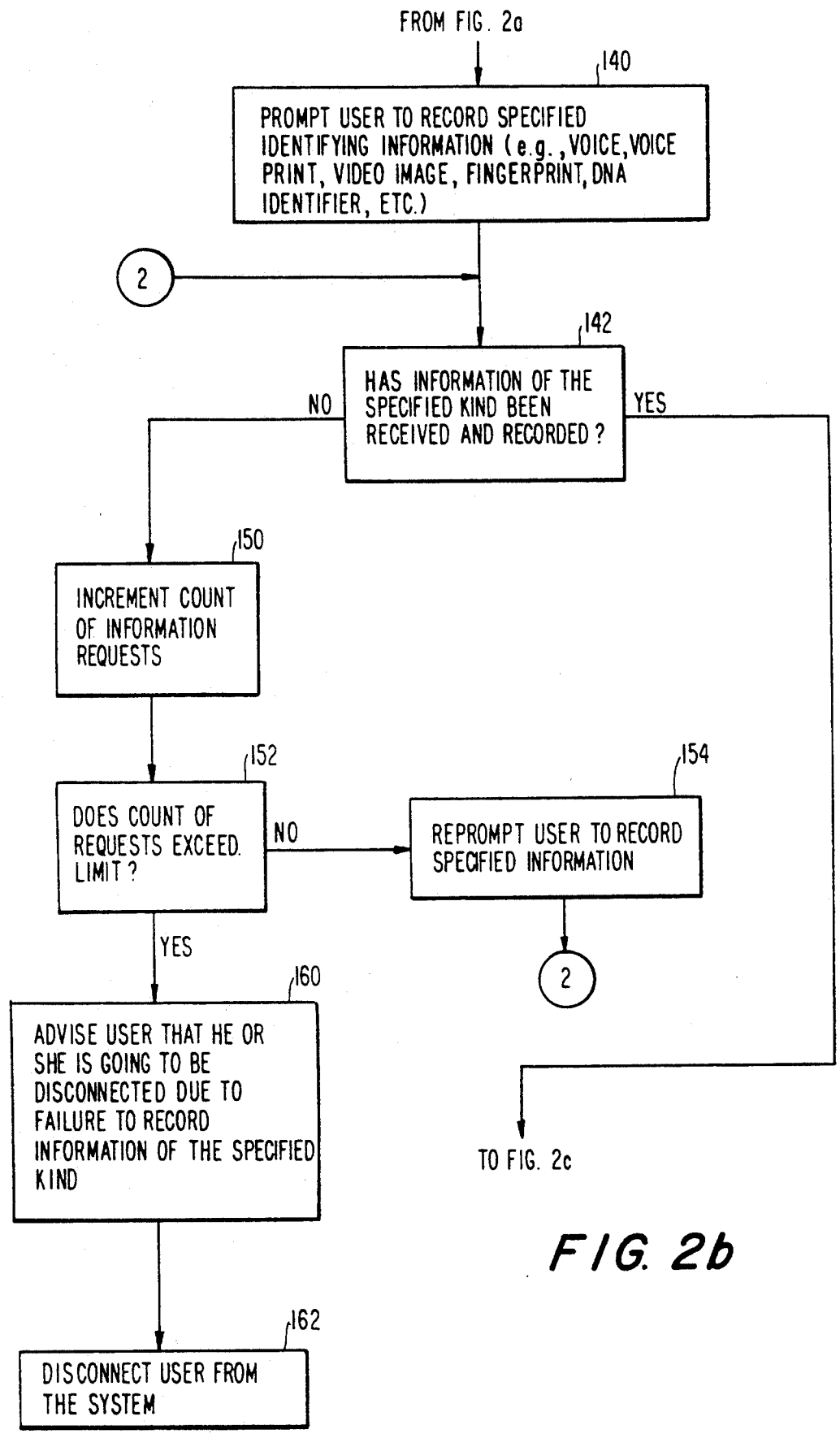
Figure 2C:
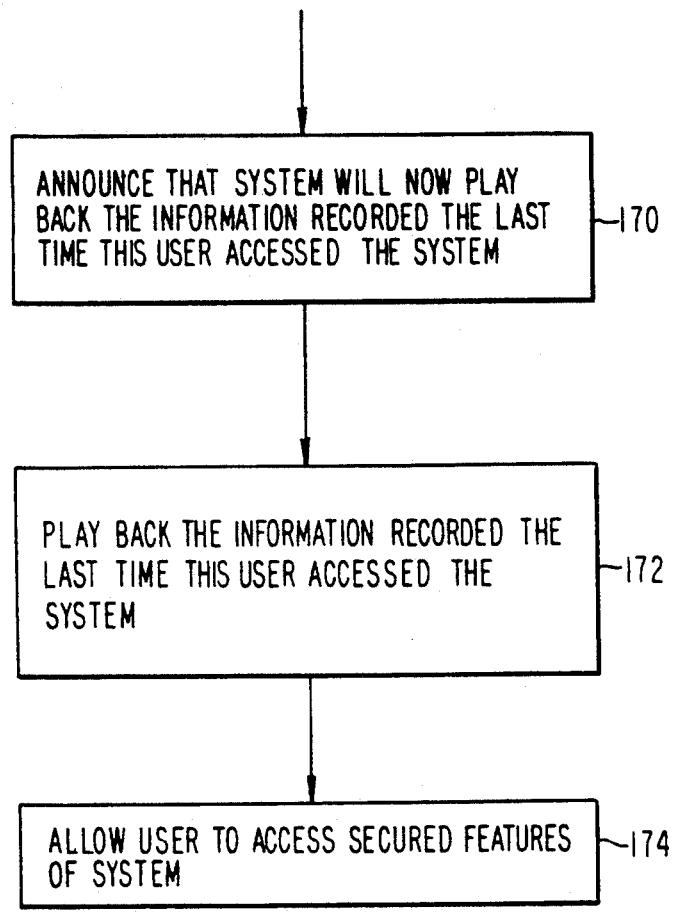

In the embodiment shown in FIG. 1 the security system of this invention is controlled by suitable software in central processor 30. FIG. 2 is a flow chart of an illustrative embodiment of such software. In step 110 processor 30 detects that the user has made a request for access to the secured features of the system (e.g., the user is a purported system subscriber who wishes to listen to voice mail messages that may have been left for him or her). In step 112 the system prompts the user to enter a conventionally required password. For example, in the case of a voice mail system, processor 30 may generate a pre-recorded audio message prompting the user to enter his or her password via the keypad of telephone 20. In step 114 processor 30 receives and attempts to validate the password data. If processor 30 determines that the password is valid, control passes to step 140. Otherwise control passes to step 120.

It should be noted that the password and/or any other similarly objective information the user is required to enter should be such as to enable processor 30 to uniquely identify each authorized user of the secured portion of the system. For simplicity in the ensuing discussion it will be assumed that the password referred to in steps 112 and 114 is sufficient to enable processor 30 to make this unique user identification.

In step 120 processor 30 advises the user that the password just entered is not valid. This may again be done by transmitting a pre-recorded voice message from processor 30 to telephone 20. In step 122 processor 30 increments a count of unsuccessful password attempts, and in step 124 the processor compares this count to an allowed limit of such attempts. This is done to make it more difficult for someone to blindly try a large number of possible passwords until finding one that works. If the comparison of step 124 produces a negative result, control passes to step 126 in which processor 30 prompts the user to retry entry of his or her password. Thereafter control returns to step 114. If the comparison of step 124 produces an affirmative result, control passes to step 130. In step 130 processor 30 transmits a pre-recorded voice message to telephone 20 advising the user that the password attempt limit has been reached and that he or she is now going to be disconnected. In step 132 processor 30 disconnects terminal device 20.

Returning now to the branch which leads from step 114 to step 140, once the user has entered a valid password (thereby enabling processor 30 to uniquely identify the user), then in step 140 processor 30 prompts the user to record specified identifying information. Once again, in the example of a voice mail system, processor 30 may transmit to telephone 20 a pre-recorded voice message requesting the user to state his or her name and the current time of day. In step 142 processor enables device 40 to record any received information for the length of time typically required for the user to enter the requested information. Also in step 142 processor 30 monitors any incoming information to determine whether or not the user has given any response of the appropriate kind. For example, if the user is required to supply voice information, processor 30 may monitor the signal from telephone 20 to determine whether or not any voice-type signal is present.

If step 142 produces a negative result, then control passes to step 150 in which processor 30 increments a count of requests it has made for the user to supply identifying information. In step 152 processor 30 compares this count to a predetermined limit. If the count does not exceed this limit, control passes to step 154 in which processor 30 again asks the user to record the specified information. Thereafter control returns to step 142. On the other hand, if step 152 produces an affirmative result, control passes from step 152 to step 160 where the process of disconnecting the user begins. In step 160 processor 30 transmits a pre-recorded message to telephone 20 telling the user that he or she is going to be disconnected for failing to enter the required identifying information, and in step 162 processor 30 effects this disconnection.

Figure 3:
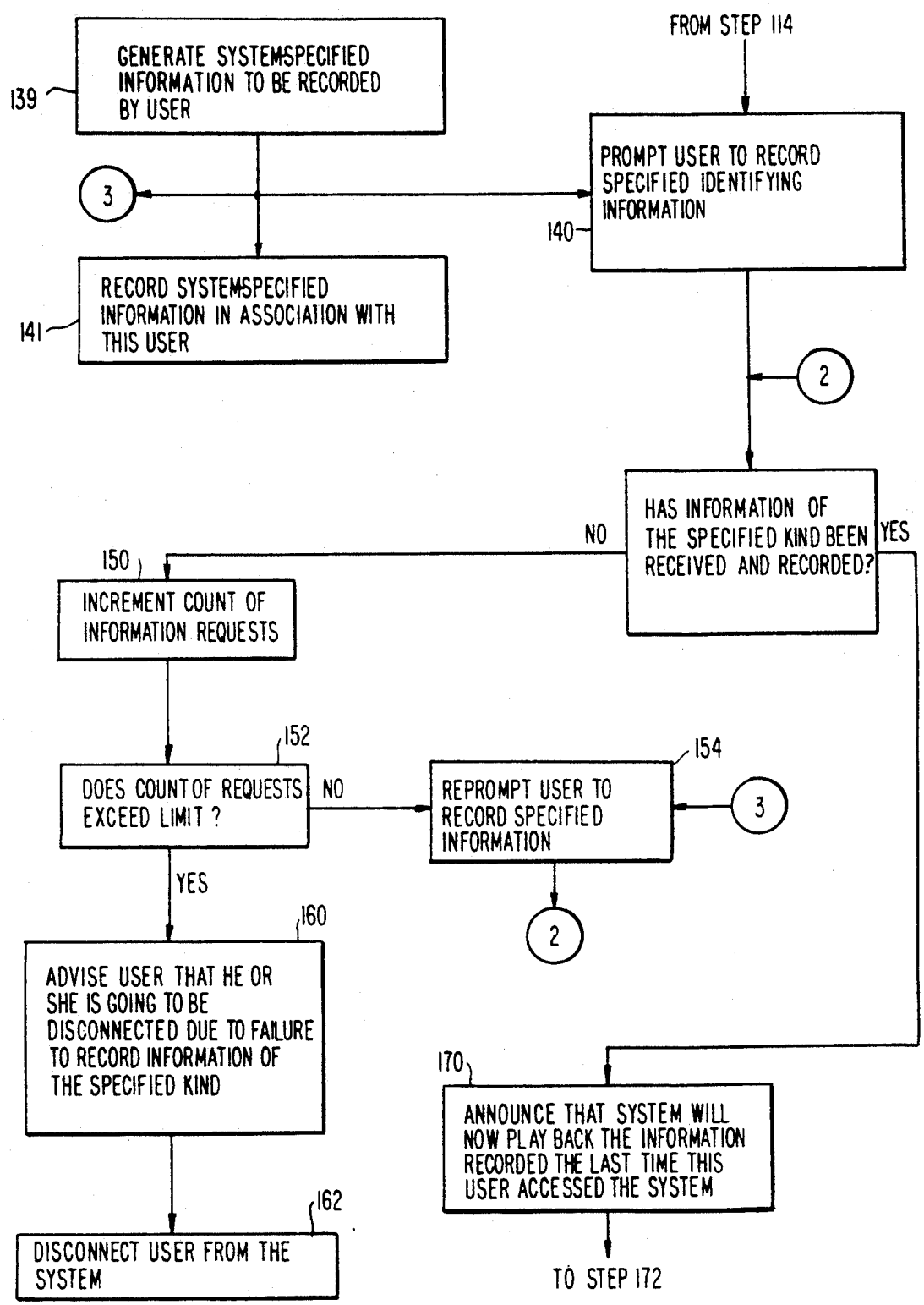
FIG. 3 is a flow chart of an alternative embodiment of the method steps shown in FIG. 2b.

In the alternative embodiment shown in FIG. 3, in addition to recording user-supplied information, the system generates (in step 139) and records (in step 141) corresponding verifying information. For example, if in step 140 the user is asked to record the current time of day, the system may generate data indicative of the current time of day (step 139) and record that data (step 141) for subsequent playback to help the user verify the authenticity of the associated user-supplied information which is subsequently played back. Alternatively or in addition, in step 139 the system may generate part of the information which the user is prompted to supply in steps 140 and 154. For example, in step 139 the system may generate a random number or a random phrase which the user is prompted to speak in steps 140 and 154. Again, in step 141 this system-generated information is recorded for subsequent playback with what the user supplies.

Returning now to the branch from step 142 to step 170 in FIG. 2, if processor 30 does detect that the user has entered information of the specified kind, then in step 170 processor 30 informs the user that it will now play back the identifying information recorded the last time the user's password was used to gain access to the system. If that last-recorded information included anything subject to change but either dictated or determinable by the system when the last recording was made as discussed above in connection with FIG. 3, the message transmitted to the user in step 170 may also include playback of that system-dictated or system-determined information. For example, in the voice mail example, if in step 140 the system requests the user to state the current time of day, a concurrent time determination made by processor 30 in step 139 (FIG. 3) may be stored in the processor in step 141 (FIG. 3) and included in the step 170 message the next time the logic of FIGS. ⅔ is performed for the same user (identified by password as described above). As another example, if in step 140 the system requests the user to repeat a random number sequence or any other random information generated by processor 30 in step 139, then processor 30 may store that random information in step 141 and repeat it as part of the step 170 message the next time that same user calls.

In step 172 processor 30 causes device 40 to play back the identifying information recorded in association with this user's password the last time information was recorded in association with that password. The user receives this play back via terminal device 20. If the user did not enter the information played back (e.g., it is not the user's voice), the user knows that someone else has used his or her password to gain access to the system, and the user can take appropriate counter-measures (e.g., change his or her password, request that system 10 trace all attempts to use his or her password, etc.). After performance of step 172, control passes to step 174 where the user is allowed to begin conventional use of the secured features of system 10.

It will be understood that the foregoing is merely illustrative of the principles of this invention and that various modifications can be made by those skilled in the art without departing from the scope and spirit of the invention. For example, although system 10 has been sometimes illustratively referred to as a voice mail system, it may alternatively be any of a wide variety of other system types such as a telephone answering system, an information center or public bulletin board system, an audio-text system, an interactive voice response system, any type of computer system, a telephone system, a forms system, an automated attendant system, or any other secured entry system. Similarly, although the identifying information specifically mentioned above in connection with illustrative system 10 is voice information, device 40 may alternatively be set up to record and play back other types of identifying information such as voice print information, a video image (e.g., of the user's face), a fingerprint image, a DNA identifier, etc. System components 20, 30, and 40 can be appropriate to whatever type of system is desired, as well as to whatever user-identifying information it is desired to record and play back via device 40.

The invention claimed is:

1. A security system comprising:
   means for recording specified information about a user each time the user uses the system, said specified information being supplied by the user each time the user uses the system, said specified information also being substantially unique to the user supplying that information; and
   means for automatically playing back to a user the specified information recorded about that same user during a preceding use of the system by that same user.

2. The system defined in claim 1 wherein the specified information is information spoken by the user.

3. The system defined in claim 2 wherein the information spoken by the user includes information selected from the group consisting of: information dictated by the system and information determinable by the system; and wherein the system further comprises:
   means for storing said selected information in association with the information spoken by the user; and
   means for informing the user of the selected information stored in association with the spoken information being played back by said means for playing back.

4. The system defined in claim 3 wherein said selected information is information generated randomly by said system.

5. The system defined in claim 3 wherein said selected information is the current time of day.

6. The system defined in claim 1 wherein said specified information is selected from the group consisting of: spoken information, voice print information, video information, fingerprint information, and DNA sequence information.

7. The system defined in claim 1 further comprising:
   means for requiring the user to enter password information each time the user uses the system.

8. The system defined in claim 7 wherein the means for recording records said specified information in association with said password information, and wherein, when particular password information is entered, said means for playing back plays back the specified information recorded in association with that password information during a preceding use of that password information.

9. The method of operating a security system comprising the steps of:
   recording specified information about a user each time the user uses the system, said specified information being supplied by the user each time the user uses the system, said specified information also being substantially unique to the user supplying that information; and
   automatically playing back to the user the specified information recorded about that same user during a preceding use of the system by that same user.

10. The method defined in claim 9 wherein said recording step comprises the step of recording information spoken by the user.

11. The method defined in claim 10 wherein the information spoken by the user includes information selected from the group consisting of: information dictated by the system and information determinable by the system, and wherein said method further comprises the steps of:
    storing said selected information in association with the information spoken by the user; and
    informing the user of the selected information stored in association with the spoken information being played back to the user.

12. The method defined in claim 11 wherein said selected information is information generated randomly by said system, and wherein said method further comprises the step of communicating said information generated randomly by said system to the user prior to performing said step of recording information spoken by the user.

13. The method defined in claim 9 wherein said recording step comprises the step of recording specified information selected from the group consisting of: spoken information, voice print information, video information, fingerprint information, and DNA sequence information.

14. The method defined in claim 9 further comprising the step of:
    requiring the user to enter password information each time the user uses the system.

15. The method of operating a security system comprising the steps of:
    recording specified information about a user each time the user uses the system, said specified information being supplied by the user each time the user uses the system, said specified information also being substantially unique to the user supplying that information, wherein said recording step comprises the step of recording information spoken by the user, and wherein the information spoken by the user includes the current time of the day;
    determining the time of day substantially concurrent with the speaking of information by the user;
    storing the time of day determined in said determining step in association with the information spoken by the user;
    playing back to the user the specified information recorded about that same user during a preceding use of the system by that same user; and informing the user of the time of day stored in association with the spoken information being played back to the user.

16. The method of operating a security system comprising the steps of:
  requiring the user to enter password information each time the user uses the system;
  recording specified information about a user each time the user uses the system, said specified information being supplied by the user each time the user uses the system, said specified information also being substantially unique to the user supplying that information;
  associating the user's password information with the specified information recorded about the user; and
  playing back to the user the specified information recorded about that same user during a preceding use of the system by that same user, the specified information to be played back being identified, when particular password information is entered, as the specified information recorded in association with a previous use of that particular password information.

* * * * *